United States Patent Office 3,170,913
Patented Feb. 23, 1965

3,170,913
AZO-BIS-ALKYLPHOSPHONATES AND
CORRESPONDING ACIDS
Peter L. De Benneville, Philadelphia, and Heinz W. Blessing, Levittown, Pa., assignors to Rohm & Haas Company, Philadelphia, Pa., a corporation of Delaware
No Drawing. Filed Feb. 8, 1962, Ser. No. 171,822
6 Claims. (Cl. 260—192)

This invention deals with azo-bis-alkylphosphonates and corresponding acids as new compositions of matter. These compositions are represented by the formula

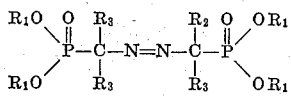

It also deals with a method for the preparation of these azo-bis-alkylphosphonates.

In the above formula $R_1$ represents hydrogen, alkyl and cycloalkyl of 1 to 12 carbon atoms, preferably two to eight carbon atoms. $R_2$ and $R_3$ are hydrocarbon groups of up to about 12 carbon atoms, preferably alkyl, cycloalkyl, alkylcycloalkyl, arylalkyl, arylalkenyl, alkylarylalkyl, aryl, and alkenyl of three to twelve carbon atoms. $R_2$ and $R_3$ taken collectively with the carbon atom to which they are attached may form an alicyclic ring of 3 to 9 carbon atoms. Preferably, the total number of carbon atoms in all of the $R_1$, $R_2$ and $R_3$ groups should not exceed 34. This preference is based on high yields and high purity of products and relative ease of preparation.

Typically, $R_1$ may represent hydrogen, methyl, ethyl, isopropyl, tert-butyl, octyl, phenyl, butylphenyl, naphthyl, and methylnaphthyl. Illustratively, $R_2$ and $R_3$ individually may represent methyl, propyl, isobutyl, tert-octyl, alkyl, butenyl, hexenyl, octenyl, cyclobutyl, cyclohexyl, benzyl, phenylbutyl, phenyl, methylnaphthyl. $R_2$ and $R_3$ collectively, including the carbon atom to which they are attached, typically represent cyclopropylidene, cyclopentylidene, cyclohexylidene, 2-methyl cyclohexylidene, or cyclooctylidene.

The compounds of the present invention are prepared by reacting an α-aminoalkylphosphonate having the following formula

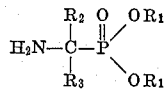

or mixture thereof, with a stable hypochlorite. When $R_1$ is hydrogen, the product of this invention must be prepared by hydrolyzing a corresponding azo ester wherein $R_1$ is other than hydrogen, such as methyl, ethyl, or the like.

The hypochlorite employed may be any stable hypochlorite, preferably an alkali metal, an alkaline earth metal, or a ($C_4$–$C_5$) tert-alkyl hypochlorite. The hypochlorite may be employed as such or may be prepared in situ by passing chlorine into an aqueous system of an alkali metal hydroxide or an alkaline earth hydroxide. The hypochlorite may be prepared in solutions containing methanol, ethanol, propanol, butanol, pentanol, or the like. Typical embodiments include the hypochlorites of lithium, sodium, potassium, calcium, and barium, as well as tert-butyl hypochlorite and tert-amyl hypochlorite, and the like.

The reaction between the hypochlorite and the α-aminoalkylphosphonate is on an equimolecular basis but it is preferred to use an excess of hypochlorite in order to assure highest yields. The hypochlorites are used in aqueous solutions in concentrations of up to about 7%, although the tert-alkyl hypochlorite can be used in higher concentrations. It is preferred to use concentrations of about 3 to 5% of the hypochlorite. It is usually preferred to have an excess of base present in the reaction system.

The present reaction may be carried out entirely in an aqueous system, although lower alkanols may be employed in order to increase the solubility of the α-aminoalkylphosphonate and the hypochlorite reactants. Reaction temperatures in the range of about −30° C. to 35° C. are employed, if desired, as long as the reaction system doesn't freeze. Alcohols such as tert-butanol may be employed in the reaction system in order to permit lower reaction temperatures by maintaining the reaction system in a homogeneous state. It is preferred to conduct the reaction by adding the α-aminoalkylphosphonate to the hypochlorite or to add the two reactants substantially simultaneously to the reaction system. The product is obtained as an oil or solid which is insoluble in the reaction system. The product may be readily separated in high purity and used without any additional steps of purification. If the product is an oil it is readily separated by extraction with ethers such as with ethyl ether, or hexane, benzene, toluene, chloroform, carbon tetrachloride, ethylene chloride, or other usual extractants. As a solid, the product may be isolated by filtration. In order to assure the highest degrees of purity of product, if an excess amount of the α-aminoalkylphosphonate has been employed, the reaction mixture is treated with dilute mineral acid, such as hydrochloric, sulfuric or the like, in order to form the amine salt of the excess α-aminoalkylphosphonate. This salt is soluble in the aqueous layer and will not contaminate the product. If it is desired to have a product that has increased water solubility, it is possible to convert the ester products to partial esters or acids by standard hydrolysis techniques, such as by heating the ester product in aqueous alkaline or acid systems.

The compounds of this invention are valuable as initiators for the polymerization of ethylenically unsaturated polymerizable monomers characterized by the group

They are also useful as blowing agents in foam systems because they may be converted by heating to yield a nitrogen molecule and a free radical. The free radical, of course, acts as the initiator of polymerization and the nitrogen gas acts as the blowing agent. The lower molecular weight compounds are preferred, as has been indicated previously. The foamed materials and polymers so formed have the valuable properties and uses known to the art.

The products of the present invention are converted to nitrogen and a free radical by heating at relatively low temperatures. The initial temperatures of conversion are readily determinable since the conversion temperature is observable because of the formation of abundant amounts of nitrogen gas. For instance, when $R_1$ represents an ethyl group the following are the conversion temperatures for compounds having the identified $R_2$ and $R_3$ substituents.

| $R_2$ | $R_3$ | Conversion temperature, ° C. |
|---|---|---|
| $CH_3$ | $CH_3$ | 135 |
| $CH_3$ | $C_2H_5$ | 120 |
| $C_2H_5$ | $C_2H_5$ | 108.5 |
| $CH_3$ | $C_6H_5$ | 112 |
| $CH_3$ | $i$-$C_4H_9$ | 110 |
| —$CH_2CH_2CH_2CH_2CH_2$— | | 118 |

The present invention can be more fully understood from the following examples which are offered by way of illustration and not by way of limitation. Parts by weight are used throughout.

*Example 1*

O,O'-diethyl-2-aminopropyl-2-phosphate (9.4 parts) is added dropwise to a stirred solution of sodium hypochlorite prepared from sodium hydroxide (8 parts), water (100 parts), and chlorine (4.5 parts). The temperature of the reaction mixture is maintained below 7° C. during the addition of the aminophosphonate. Stirring is continued for 2 hours after addition is completed while maintaining the temperature of the mixture below 10° C. On storing in a refrigerator overnight, the product separates as an oil from the mixture. The azo-phosphonate is isolated by ethyl ether extraction of the product mixture. Evaporation of the ether extract leaves the azophosphonate as a yellow oil (8.16 parts, $n_D^{26}=1.4459$). The product contains 6.93% nitrogen (7.24% theoretical), and 15.41% phosphorus (16.03% theoretical). The product has the structure

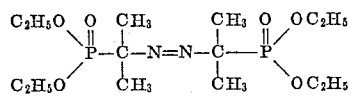

Conversion of a sample of this azophosphonate at 165° C. in a vacuum line gives a nitrogen pressure which is 90–95% of the theoretical value. The converted product is a high-boiling yellow oil. This compound contains 46.59% carbon (46.94% theoretical), 9.19% hydrogen (9.00% theoretical), 16.89% phosphorus (17.28% theoretical). The product has the formula

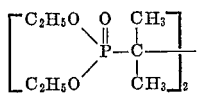

Following the same oxidation procedure, the following azophosphonates are prepared:

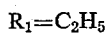

| R₂ | R₃ |
|---|---|
| CH₃ | C₂H₅ |
| CH₃ | i-C₄H₉ |
| CH₃ | C₆H₅ |
| C₂H₅ | C₂H₅ |
| —CH₂CH₂CH₂CH₂CH₂— | |

*Example 2*

O,O'-diethyl 1-amino-1-isobutyl-3-methylbutylphosphonate (33.5 parts) is added dropwise over a two hour period to a stirred aqueous alkaline sodium hypochlorite solution (270.4 parts) prepared previously by passing chlorine (18.4 parts) into aqueous sodium hydroxide solution (32 parts of sodium hydroxide in 400 parts of water). The reaction mixture is maintained at 1–2° C. during the addition of the aminophosphonate. Stirring is continued for 4 hours after addition is completed. The reaction mixture is stored in a refrigerator overnight. The azophosphonate which separates from the oxidation mixture as a light yellow oil is isolated by ether extraction. Unreacted aminophosphonate (9.3 parts) is recovered by washing the ether extracts with dilute aqueous 10% hydrochloric acid followed by neutralization with base.

The acid-washed ether solution of the azophosphonate is dried over anhydrous sodium sulfate. Evaporation of the ether at room temperature under vacuum gives 1,1'-azo-bis(O,O'-diethyl 1-isobutyl-3-methyl butylphosphonate) (23 parts) of the structure:

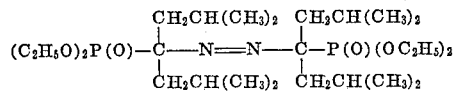

Similarly, oxidation of O,O'-dibutyl 1-amino-1-methylethylphosphonate and O,O'-di(2-ethyl)hexyl 1-amino-1-methylethylphosphonate by the same general procedure gives the corresponding azophosphonates which separate as light yellow viscous oils from the oxidation mixture, and can be purified if necessary by washing with dilute 10% hydrochloric acid. Using the same procedure, O,O'-diethyl 1-amino-1-methylundecylphosphonate is oxidized to 1,1'-azo-bis-(O,O'-diethyl 1-methylundecylphosphonate). Similarly, oxidation of O,O'-diethyl 1-amino-1-methyl-4-pentenylphosphonate and of O,O'-diethyl 1-amino - 1 - methyl - 5 - phenyl - 3 - pentenylphosphonate give 1,1'-azo-bis-(O,O'-diethyl 1-methyl-4-pentenylphosphonate) and 1,1'-azo-bis-(O,O'-diethyl 1-methyl-5-phenyl-3-pentenylphosphonate), respectively. These products are viscous oils which decompose with evolution of nitrogen when heated above 100° C.

*Example 3*

Dry ammonia is passed into a stirred mixture of diethyl phosphite (55.3 parts) and methyl cyclopropyl ketone (33.7 parts) for 1 hour at room temperature, then for 5 hours while maintaining the reaction mixture at 50° C. The mixture is left at ambient temperature for several days and is then filtered to remove solid by-product (17 parts). The filtrate is stripped of unreacted starting materials by heating to 95° at 0.7 mm. Hg. The stripped residue is a pale yellow oil (56.1 parts) and is identified by elemental analysis as O,O'-diethyl 1-amino-1-cyclopropylethylphosphonate.

The aminophosphonate is oxidized to the azophosphonate as follows:

The aminophosphonate (44.25 parts) is dropped over a 3 hour period into a stirred aqueous alkaline sodium hypochlorite solution previously prepared by passing chlorine (18.4 parts) into a cold solution of sodium hydroxide (32 parts) in water (400 parts). The reaction temperature is 1.2–2.5° C. during the addition of the aminophosphonate. Stirring is continued for 3 hours while maintaining the temperature of the reaction mixture below 6° C. The azophosphonate separates from the mixture as a heavy pale green oil on standing and is isolated by ether extraction. When heated in a capillary tube the azophosphonate starts to decompose at 98° C. with evolution of nitrogen gas.

*Example 4*

Dry ammonia is passed into a stirred mixture of diethyl phosphite (69.1 parts) and cyclohexanone (49.1 parts). The formation of the aminophosphonate is exothermic and the temperature of the reaction mixture gradually rises from 28° to 43° C. over a 2-hour period. When the exotherm subsides, the reaction mixture is heated to 50° C. and maintained at this temperature for 4.5 hours under an ammonia atmosphere.

The product mixture is allowed to stand at ambient temperature overnight and is then stripped of unreacted diethyl phosphite and excess ammonia by heating to 115° C. at 5 mm. Hg. The aminophosphonate contained in the residue is separated from unreacted cyclohexanone by converting it to the picrate. The stripped residue is treated with a saturated solution of picric acid in ether. The ether-insoluble yellow picrate is filtered from the solution, air-dried, and recrystallized twice from ethanol to give 58.9 parts of pure product, M.P. 175–6° C.

O,O'-diethyl 1-amino-cyclohexylphosphonate is regenerated from the picrate (55.6 parts) by treatment with excess aqueous sodium hydroxide solution while cooling in an ice bath. The regenerated aminophosphonate (30.9 parts) is recovered by ether extraction as a light yellow oil. It is free of cyclohexanone but contains a small amount of sodium picrate which does not interfere in the oxidation step.

The aminophosphonate (25.8 parts) is converted to the azo phosphonate (19.2 parts) by oxidation with alkaline hypochlorite solution as illustrated in Example 2. The solid azo phosphonate which separates from the oxidation mixture is obtained as a light yellow powder (M.P. 60–63° C.) by filtration, washing with cold water, and drying under vacuum.

By a similar procedure, 1,1′-azo-bis-(O,O′-diethyl cyclooctylphosphonate) is prepared from O,O′-diethyl 1-aminocyclooctylphosphonate, and 1,1′-azo-bis-(O,O′-diethyl cyclononylphosphonate) from O,O′-diethyl 1-aminocyclononylphosphonate. They are obtained as light-yellow oils, which evolve about one mole of nitrogen per mole on heating to 150° C.

*Example 5*

O,O′-diethyl - 1 - amino-1-α-naphthylethylphosphonate (9.23 parts; isolated from the reaction of equimolar amounts of methyl α-naphthyl ketone and diethyl phosphite with excess ammonia as the picrate and regenerated by treating the picrate with aqueous sodium hydroxide) is dropped over a 2 hour period into a stirred alkaline sodium hypochlorite solution maintained at 0.7–1.5° C. As the amine is added, yellow, pasty solids are formed. Stirring is continued for 4 hours at 0.5–1.2° C. During this period the yellow solids turn white and become more finely divided. After storing in a refrigerator overnight, the azophosphonate is filtered from the reaction mixture, washed with water, and dried at room temperature under vacuum. The crude azophosphonate (9.31 parts) has a melting point of 78–9° C. and starts to decompose at 107° C.

By a similar procedure 1,1′-azo-bis-(O,O′-diethyl-1-benzylethylphosphonate) is prepared by oxidation of the aminophosphonate obtained from the reaction of methyl benzyl ketone with diethyl phosphite and ammonia. Similarly, 1,1′ - azo - bis - (O,O′ - diethyl-1-p-tolylethylphosphonate) is obtained by the oxidation of O,O′-diethyl-1-amino-1-p-tolylethylphosphonate.

*Example 6*

O,O′ - diethyl - 1 - amino-1-phenylbenzylphosphonate hydrochloride (21.35 parts) is added in small portions over a 1.5 hour period to a stirred aqueous alkaline sodium hypochlorite solution prepared by passing chlorine gas (5.5 parts) into a cold solution of sodium hydroxide (12.0 parts) in water (145 parts). The temperature is held at 1–1.5° C. during the addition of the hydrochloride. Stirring of the reaction mixture is continued for 5 hours at 1.5–2° C. White, gummy solids are formed during the oxidation period. The reaction mixture is extracted with ether and the combined ether extracts are washed with dilute hydrochloric acid to remove unreacted aminophosphonate. Evaporation of the ether extracts under reduced pressure gives the crude azophosphonate (5.95 parts) as a light tan solid, M.P. 110–111° C. It decomposes with nitrogen evolution when heated to 112° C.

*Example 7*

O,O′-diethyl-1-amino-1-phenylethylphosphonate is prepared by reacting diethyl phosphite (55.3 parts) and acetophenone (48.0 parts) with ammonia gas at atmospheric pressure for 4.5 hours at 50° C., followed by 2.75 hours at 100° C. The aminophosphonate is isolated from the reaction mixture as the picrate (58 parts; recrystallized from ethanol) and regenerated by treating the picrate with an excess of aqueous sodium hydroxide. The aminophosphonate is thereby obtained as a viscous yellow oil (23.1 parts) containing a small amount of sodium picrate.

In a mixture of 50 parts of distilled water and 50 parts of ice is suspended 11.2 parts of calcium oxide. Chlorine gas is passed in at 3–5° C. until there is a gain equal to 4.45 parts of chlorine gas. To the mixture is then added, with stirring, 12.9 parts of the aminophosphonate prepared above, over a half-hour period, at 5–10° C. The mixture is placed in the refrigerator at 5° overnight, and then filtered. The solid is extracted with hot methylal, and filtered off while hot. The methylal is evaporated under vacuum, and the resulting azophosphonate recovered as a white solid, M.P. 82–83° C., decomposing about 112° C.

In a similar fashion, from methyl hexyl ketone, there is prepared O,O′ - diethyl 1-amino-1-methylheptylphosphonate. This is oxidized in the same manner with calcium hypochlorite. The entire reaction mixture is extracted with ether, and the solids washed with ether. Upon evaporation these ether extracts give a neutral yellow-green oil, analyzing correctly for the structure:

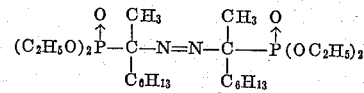

*Example 8*

To 50 parts of water cooled to about 0° C. are added 3.8 parts of sodium chloride, 4.4 parts of sodium hydroxide and 10.9 parts of tert. butyl hypochlorite. To the mixture is added, dropwise over a two hour period at 2–4° C., 12.3 parts of O,O′-diethyl 1-amino-1,3-dimethylbutylphosphonate, having the structure:

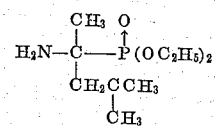

The mixture is held at 2–5° C. for a period of 60 hours, and the reaction mixture is then extracted with ether. The ether layer is washed with aqueous 10% sodium sulfite solution, and then with 1 N HCl solution and water. It is then dried over magnesium sulfate and stripped to give 7.42 parts of a yellow-green oil, which analyzes correctly for the corresponding azophosphonate.

In the same way, from O,O′-diethyl 1-amino-1,2,2-trimethylpropylphosphonate, by treatment with tert-amyl hypochlorite in a mixture with water and sodium hydroxide, there is obtained the corresponding azophosphonate of the structure:

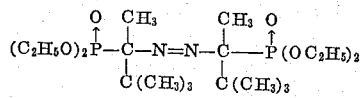

The azo-bis-alkylphosphonates and corresponding acids of this invention may be employed as indicated in the following illustrative examples.

*Example A*

1,1′ - azo - bis - (O,O′-diethyl-1-cyclopropylethylphosphonate) (0.2 part) is added to freshly distilled styrene (10 parts) contained in a test tube. The mixture is flushed and sealed under nitrogen and then heated at 80° C. for 24 hours. A solid rod of clear polymer is obtained, whereas a control without azophosphonate initiator is only viscous.

*Example B*

A mixture of vinyl acetate (20 parts) and benzene (50 parts) is heated to reflux temperature under nitrogen and 1,1′-azo-bis-(O,O′-diethyl 1-cyclohexylphosphonate) (0.1 part) is added. Heating at reflux under nitrogen is continued for 6 hours. After removing benzene and unreacted monomer by steam distillation a gummy mass of poly(vinyl acetate) is obtained.

*Example C*

A mixture of methyl methacrylate (5 ml.) containing 0.01% methyl ether of hydroquinone inhibitor and 1,1′-azo-bis-(O,O′-diethyl 1-phenylethylphosphonate) (0.015 part) is flushed and sealed under nitrogen and then heated at 80° C. for 24 hours. A very viscous polymer is obtained whereas a control without azophosphonate initiator remains fluid. Similarly, using the same azophosphonate initiator concentration ($6 \times 10^{-3}$ moles/l. of monomer)

at 80° C. viscous poly(methyl methacrylate) is obtained on polymerization of inhibited methyl methacrylate for 24 hours with each of 1,1'-azo-bis-(O,O'-diethyl 1-phenylbenzenylphosphonate), 1,1'-azo-bis-(O,O'-diethyl 1-α-naphthylethylphosphonate), 1,1'-azo-bis-(O,O'-diethyl 1-cyclohexylphosphonate), 1,1'-azo-bis-(O,O'-diethyl 1-methylheptylphosphonate), and 1,1'-bis-(O,O'-diethyl 1-isobutyl-3-methylbutylphosphonate) initiator.

When these experiments are repeated with methyl methacrylate containing no inhibitor, solid poly(methyl methacrylate) is produced under identical conditions.

Example D

Samples of isopropyl methacrylate (5 ml.) containing azophosphonate initiator at a concentration of $2 + 10^{-3}$ mole/l. of monomer are flushed and sealed under nitrogen and then heated at 80° C. for 24 hours. Solid poly(isopropyl methacrylate) is produced with all azophosphonate initiators tested, such as 1,1'-azo-bis-(O,O'-diethyl 1-methylethylphosphonate), 1,1'-azo-bis-(O,O'-diethyl 1-methyl-3-methylbutylphosphonate), 1,1'-azo-bis-(O,O'-diethyl 1-cyclopropylethylphosphonate), 1,1'-azo-bis-(O,O'-diethyl 1-phenylbenzylphosphonate), and 1,1'-azo-bis-(O,O'-diethyl 1-methylheptylphosphonate). A control containing no initiator remains fluid.

In similar fashion, a mixture of 90 parts of acrylonitrile and 10 parts of acrylamide is copolymerized using 0.1 part of 1,1'-azo-bis-(O,O'-diethyl 1-cyclopropylethylphosphonate), of the structure:

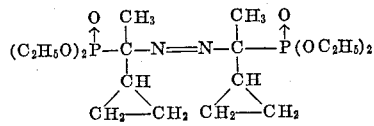

We claim:
1. A compound having the formula

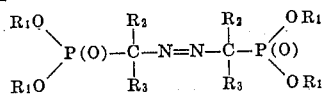

in which
R₁ represents a member selected from the group consisting of hydrogen and alkyl of 1 to 12 carbon atoms,
R₂ and R₃ taken individually are hydrocarbon groups of up to about 12 carbon atoms from the class consisting of alkyl, cycloalkyl, alkylarylalkyl, arylalkyl, arylalkenyl, alkylarylalkyl, aryl, and alkenyl wherein said alkenyl contains at least 3 carbon atoms and
R₂ and R₃ taken collectively with the carbon atom to which they are attached form an alicyclic ring of 3 to 9 carbon atoms.
2. The compound

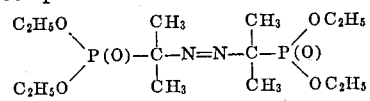

3. The compound 1,1'-azo-bis-(O,O'-diethyl 1-isobutyl-3-methyl butylphosphonate).
4. The compound 1,1'-azo-bis-(O,O'-diethyl 1-cyclohexylphosphonate).
5. The compound 1,1'-azo-bis-(O,O'-diethyl 1-phenylethylphosphonate).
6. The compound 1,1'-azo-bis-(O,O'-diethyl 1-cyclopropylethylphosphonate).

References Cited in the file of this patent
UNITED STATES PATENTS

| | | |
|---|---|---|
| 2,711,405 | Anderson | June 21, 1955 |
| 2,713,576 | Benneville | July 19, 1955 |

UNITED STATES PATENT OFFICE
CERTIFICATE OF CORRECTION

Patent No. 3,170,913

February 23, 1965

Peter L. De Benneville et al.

It is hereby certified that error appears in the above numbered patent requiring correction and that the said Letters Patent should read as corrected below.

Column 8, lines 13 and 14, strike out "alkylarylalkyl", each occurrence.

Signed and sealed this 20th day of July 1965.

(SEAL)
Attest:

ERNEST W. SWIDER
Attesting Officer

EDWARD J. BRENNER
Commissioner of Patents